Figure 1:
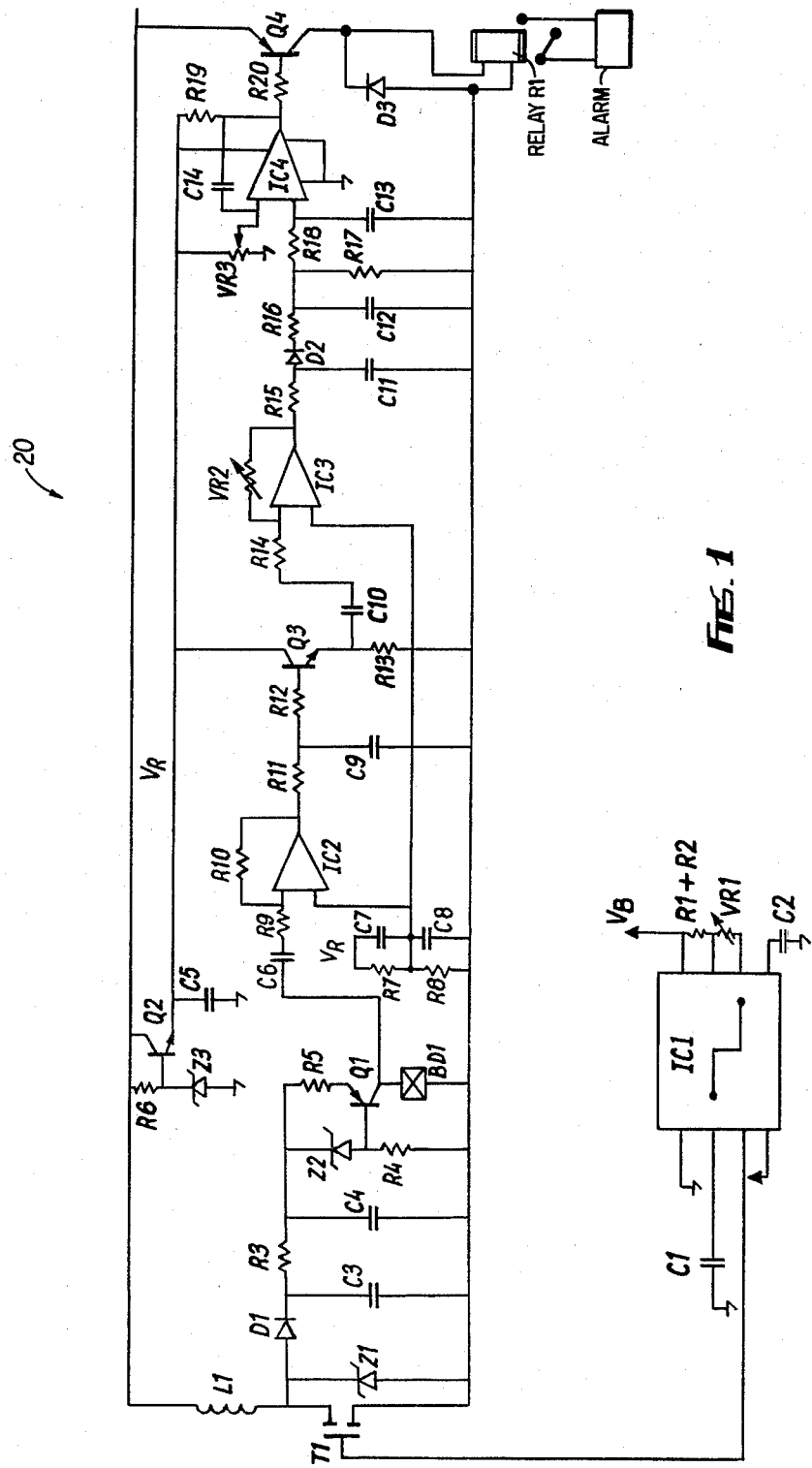

United States Patent [19]

Stewart et al.

[11] 4,358,759
[45] Nov. 9, 1982

[54] MICROWAVE MOVEMENT DETECTOR

[75] Inventors: James A. C. Stewart; Brian M. Armstrong, both of Belfast; Harold S. Gamble, Banridge; John Mallon, Belfast; Fabian C. Monds, Belfast; William D. Ryan, Belfast; James Wakefield, Ballygowan, all of Northern Ireland

[73] Assignee: The Queens University of Belfast, Belfast, Northern Ireland

[21] Appl. No.: 158,141

[22] Filed: Jun. 10, 1980

[30] Foreign Application Priority Data

Jun. 13, 1979 [GB] United Kingdom ............... 7920597

[51] Int. Cl.[3] .................... G08B 13/22; G01S 9/02
[52] U.S. Cl. ........................... 340/554; 331/107 R; 343/5 DD; 343/5 PD
[58] Field of Search ............... 340/552, 553, 554; 343/5 DD, 5 PD; 375/92, 93; 455/84, 85, 86; 331/107 R

[56] References Cited

U.S. PATENT DOCUMENTS 3,992,715 11/1976 Delagebeaudeuf et al. .... 331/107 R

FOREIGN PATENT DOCUMENTS 2819783 11/1978 Fed. Rep. of Germany ... 343/5 DD

OTHER PUBLICATIONS

Patent Associated Literature; Electronics, vol. 50, No. 3, p. 2E, 3 Feb. 1977; "Module Detects Moving Objects With Microwaves".
Solid State Electronics; Jan. 1973, vol. 16, pp. 85-91: "Microwave Oscillations In PNP Reach-Through Baritt Diodes by CHN et al.
"Low Cost X-Band MIC Baritt Dopler Sensor" by S. P. Kwok; IEEE Transactions On Microwave Theory And Techniques; vol. MTT-27, No. 10; Oct. 1979; pp. 844-847.
"Fresnel-Zone Plate Aids Low-Cost Doppler Design" by M. J. Lazarus et al; MICROWAVES; vol. 18, No. 11; Nov. 1979; pp. 78-80.
Microwave Intruder Alarm-2 "Construction Of Doppler Radar To Detect Movement" by M. W. Hosking; Wireless World; vol. 83, No. 1500; Aug. 1977; pp. 37-40.

Primary Examiner—John W. Caldwell, Sr.
Assistant Examiner—Daniel Myer
Attorney, Agent, or Firm—Fleit & Jacobson

[57] ABSTRACT

A microwave generating and receiving module generates and transmits a microwave signal which is reflected by a moving target and received back by the module. The module comprises a disc-form Baritt diode BD1 or Gunn diode acting as both oscillator and mixer and forming part of microstrip circuitry and signal processing circuitry which processes the reflected signal to extract relevant target information. The signal processing circuitry can be physically displaced from the module and connected to it by a coaxial line. By operating the diode in the diplex mode the requisite target information can be provided for with a compact construction.

24 Claims, 2 Drawing Figures

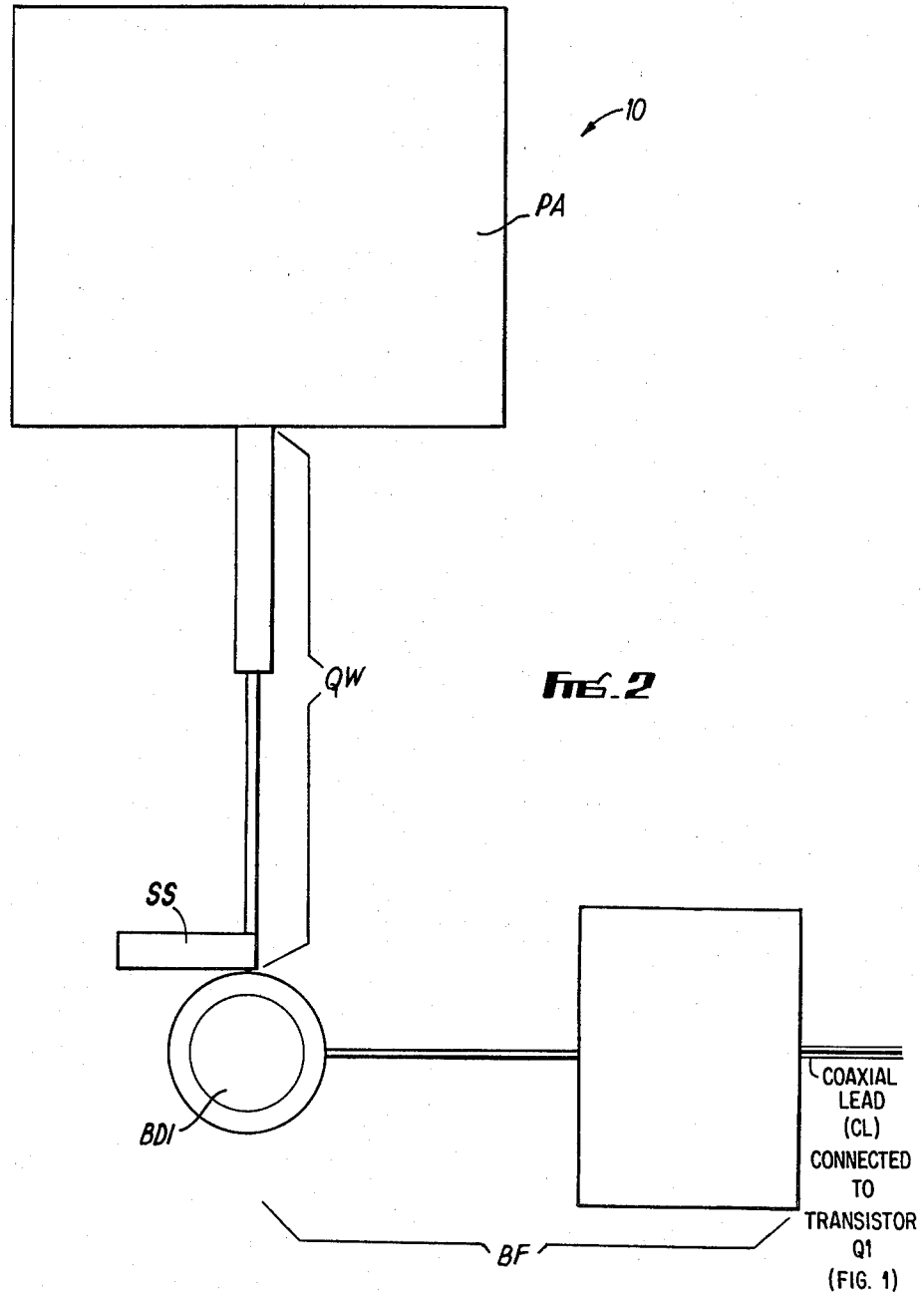

MICROWAVE MOVEMENT DETECTOR

This invention relates to a microwave movement detector particularly although not exclusively for use as an intruder alarm.

An object of the present invention is to provide a microwave movement detector which is sensitive and reliable in operation yet which can be constructed in a simple and inexpensive manner with a conveniently small and compact format.

According to one aspect of the invention therefore a microwave movement detector comprises a microwave generating and receiving module for use in generating a transmitted microwave signal to be intercepted by a moving target and for receiving a reflected microwave signal from such target, in which the module comprises microstrip circuitry in combination with a Baritt diode arranged to act both as an oscillator and also as a mixer.

With this arrangement, great operational sensitivity and reliability can be achieved and yet the module can be constructed in a simple and inexpensive manner as a conveniently small and compact device. In one embodiment the module may be in the form of a thin disc having a thickness of, say 0.5 cm, and a diameter which may be as small as about 3 cm.

The said module may be connected to signal processing circuitry responsive to the relationship between the transmitted and reflected signals, for example so as to produce an output whenever target movement is detected, or only so as to produce an output when one or more parameters of such movement (range, velocity, direction) are of a predetermined nature or changes in a predetermined manner. Most conveniently, said signal processing circuitry may be provided in the form of a signal processing module separate from the aforesaid generating and receiving module, and, in accordance with one embodiment, the two modules may be up to 100 m away from each other and interconnected by a simple coaxial or twin cable. The signal processing module may be powered by mains supply, or a 12 V d.c. battery or otherwise as appropriate, and such module may also act to supply operating power to the generating and receiving module.

The output produced by the signal processing module may be utilised for alarm purposes to actuate a separate remote warning bell or siren or the like. Alternatively, if desired, the movement detector of the invention may incorporate an alarm module connected to the said signal processing module and arranged to produce modulated warning tone when actuated by said output. Such alarm module may incorporate a stand-by rechargeable battery.

As mentioned above, the detector of the invention may operate in the manner of a simple Doppler detector sensitive only to movement, but preferably the transmitted microwave signal is modulated so that quantitative information as to range, velocity and direction can be obtained, the detector thereby operating in accordance with a diplex configuration. With such diplex configuration, advantageously the requisite information can be obtained with a particularly simple construction.

In accordance with one embodiment of the invention, the diplex configuration is such that the transmitter is repetitively switched between two frequencies say 3 MHz apart at X-band to give two discrete spectral lines separated by 3 MHz. The magnitude of such frequency difference may be decreased with increase in the maximum range to be measured (beyond say 25 m). The reflected signal from a moving target results, after mixing in the Baritt diode, in a video signal which is a composite of two Doppler signals sampled sequentially at the modulation rate (say 10 kHz). The relative phase of these Doppler signals provides range and velocity sense information, whilst the Doppler beat frequency is proportional to the target velocity relative to the detector. The switching of the transmitter between the two frequencies may be achieved by square-wave modulation of the Baritt diode bias current. With such square-wave modulation particularly simple video circuitry may be used, however sinusoidal modulation may alternatively be used and this allows improved range resolution without reducing the maximum unambiguous range.

With regard to the Baritt diode, this may be a conventional "barrier injection transit time" device formed from a $p^+$ $np^+$ construction. Alternatively, a specially fabricated ion-implanted device or an 'electron' type Baritt diode may be utilised.

While the utilization of a Baritt diode constitutes an essential feature of the first aspect of the present invention, it has been found that the utilization of a Gunn diode (i.e. a transfer electron diode) may be advantageous in the context of the present invention in the case where microstrip circuitry of diplex configuration (as described above) is also utilized. Thus, and in accordance with a second aspect of the present invention there is provided a microwave movement detector comprising a microwave generating and receiving module for use in generating a transmitted microwave signal to be intercepted by a moving target and for receiving a reflected microwave signal from such target, in which the said module comprises microstrip circuitry in combination with a Gunn diode arranged to act both as an oscillator and as a mixer, said circuitry being of diplex configuration.

Whilst it is anticipated that the present invention will find particular application in the context of an intruder alarm such as a burglar alarm, it is to be understood that the invention is not intended to be restricted to this field of application and the detector of the invention may be utilized for detecting movement of persons or vehicles or any other suitable targets in any suitable environment for any suitable purpose. When utilized as an intruder alarm the said generating and receiving module, due to its possible small size, can be easily and conveniently concealed. Also multiple such modules may be utilized together to enable a large area to be protected. By virtue of the range gate facility, false alarms can be minimized. In the case where the invention is applied to the monitoring of vehicles, a standard Doppler format may be used. Selective monitoring can be achieved by virtue of the direction sense of the detector, and the range gate facility is useful in distinguishing vehicles in a cluttered environment. In the case where the invention is applied to the counting of persons entering or leaving an enclosure, due to the direction sense of the detector it is possible to distinguish between persons entering and leaving.

The invention will now be described further by way of example only and with reference to the accompanying drawings, in which:

FIG. 1 is a circuit diagram of one form of a microwave movement detector according to the invention, and FIG. 2 shows the layout of microstrip circuitry of a microwave signal generating and receiving module of said detector.

The detector is for use as a burglar alarm and comprises two separate modules: a microwave signal generating and receiving module and a power supply and signal processing module.

The first module 10 (shown in FIG. 2) comprises a microstrip circuit and is in the form of a disc BD1 say 5 mm depth and 5 cm in diameter. The disc BD1 may conveniently be recessed into a wall or ceiling surface of a room so as to be concealed. The microstrip module 10 operates at a frequency of 10.687 $GH_Z \pm 12$ $MH_Z$ and has a power output of up to 5 mW. Typically an output of 5 mW X-band power can be obtained with a diode d.c. bias voltage (as explained hereinafter) of 45 volts, or even with a voltage of 10 to 20 V in the case of an electron type Baritt. The aerial coverage, which depends on aerial design, may be appropriate to a room of say 6 m ×6 m, or if desired may involve a higher gain longer range narrow beam appropriate to, for example, a corridor up to say 10 to 15 m.

The microstrip circuitry constitutes shaped strip conductors and a conductive ground plane separated by a dielectric medium of glas fibre reinforced polytetrafluoroethylene known as RT/duroid 5880. A Baritt diode BD1 mounted in a standard F4 type microwave package is incorporated in the circuitry and connected at an appropriate position between the ground plane and a strip conductor. A typical strip conductor layout is shown in FIG. 2 and this incorporates a low-gain pad aerial PA which is matched to the encapsulated diode BD1 at the operating frequency. The layout also incorporates a bias filter BF to effect the transition between the microstrip structure and a coaxial lead (as described hereinafter). The layout further incorporates a quarter wave transformer QW and a shunt stub SS.

The aforesaid second module (the power supply and signal processing module) 20 of FIG. 1 has a total power consumption (from a 12 V d.c. battery) of less than 1 W and has dimensions of 10 cm×5 cm×2.5 cm. This second module 20 is connected to the first module 10 via the aforesaid coaxial lead CL which may be up to 100 m in length.

As can be seen from FIG. 1, the second module incorporates an oscillator circuit (incorporating IC1) which pulses current through an inductance coil L1, so that the requisite voltage for application to the Baritt diode (a voltage in the range 15 V to 65 V is required depending on the Baritt design) can be obtained from the 12 V d.c. supply. High voltage pulses fed to the coil L1 via Transistor T1 charge storage capacitors C3 and C4 via diode D1. A zener diode Z1 is connected across the output of the transistor T1. The magnitude of the potential across these capacitors can be selected up to 72 V by choice of the coil L1 and the oscillator timing.

Constant current supply to the Baritt diode is effected by transistor Q1 from the storage capacitors C3 and C4. The value of such current ranges between 5 mA and 20 mA and is determined by the relative values of zener diode Z2 and resistor R5. The value of this constant current determines the output power of the Baritt diode. The electrical signal which appears across the Baritt diode is a steady d.c. bias voltage, of "punchthrough" magnitude, with a small Doppler signal voltage superimposed. The frequency and amplitude of the Doppler signal is dependent on the speed and apparent size respectively of the approaching or receding target.

Typical amplitudes being in the lower millivolt region for a man-sized target a few meters range from the microstrip module. Amplification and filtering of the Doppler signal is provided by the Operational Amplifiers IC2 and IC3.

After initial amplification of the Doppler Signal in IC2 a first stage of low-pass filtering (R11, C9 takes place, followed by further, and amplification in IC3 and second-stage filtering (R15, C11). Integration of the "cleaned-up" signal is provided by the network D2 R16 C12 and a comparison of its value is made against a reference voltage, set up on VR3, in IC4. Detection of a Doppler signal of sufficient amplitude and frequency results in relay R1 being allowed to close.

A regulated 7.5 V supply is obtained via transistor Q2, and is used to power the complete amplification and comparison circuitry to reduce the effect of battery condition and pulse noise.

With the inductance coil L1 wound to given specifications the "on" time of the oscillator IC1, adjustable via VR1, is used to set the minimum value of battery supply voltage VB for which sufficient high-voltage power is available. Typically the battery supply, nominally 12 V, can vary from 10 V to 14 V without affecting performance of the system.

On power switch-on the system is deactivated for a period of approximately 45 seconds, so allowing the operator time to leave without detection.

The normally open contacts of the relay R1 are utilised to effect actuation of an audible warning device (not shown) on closure of same. Such audible warning device may constitute a third module which may be mounted adjacent the second module, for example in a common housing or on a common control panel, such third module being self-powered and being arranged to produce a modulated warning tone on actuation of same. Suitably the dimensions of such third module may be 5 cm×10 cm×4 cm. The second and third modules may be located at a convenient control position remote from the first module.

The arrangement described above is particularly reliable and sensitive in operation. Typically a mansized moving target can be detected at a range of 25 m. The sensitivity of the Baritt diode operating in the diplex mode may be $-127$ $dBm/H_Z$ at 1 $kH_Z$. The output frequency of the first module (microstrip circuit) can be chosen between the frequency limits 9.5 GHZ to 11.5 GHZ as required by local regulations. Inherent compensation between the packaged Baritt diode and the microstrip circuit pattern can provide an output frequency temperature stability of 0.5 MHZ/° C.

Due to the use of the Baritt diode in diplex mode in microstrip circuitry, and having regard to the fact that the diode acts both as oscillator and mixer, a particularly simple, inexpensive and compact construction results.

It is of course to be understood that the invention is not intended to be restricted to the details of the above embodiment which are described by way of example only.

What is claimed is:

1. A microwave movement detector comprising a microwave generating and receiving module for use in generating and transmitting a microwave signal to be intercepted and reflected by a moving target and for receiving the reflected microwave signal from said target, wherein the microwave generating and receiving module comprises microstrip circuitry in combination with a diode acting as both an oscillator and a mixer, said detector further comprising modulating means for modulating the generated microwave signal so that quantitive information as to target range, velocity and direction can be obtained, whereby the detector operates in accordance with a diplex configuration, wherein said detector includes a transmitter for transmitting the modulated generated microwave signal, and wherein the modulating means repetitively switches the transmitter of the microwave generating and receiving module between two frequencies to provide a signal having two spectral lines separated by gaps between the frequencies.

2. A microwave movement detector as claimed in claim 1 wherein said diode has a bias current, and the modulating means applies square-wave modulation to the diode bias current.

3. A microwave movement detector as claimed in claim 2, wherein said diode mixes the reflected signal to obtain a video signal comprising two Doppler signals, and the microwave generating and receiving module comprises a sampling circuit for sequentially sampling said two Doppler signals.

4. A microwave movement detector as claimed in claim 3 wherein the diode comprises a barrier injection transit time device of p+ np+ construction.

5. A microwave movement detector as claimed in claim 3, wherein the diode comprises an ion implanted device.

6. A microwave movement detector as claimed in claim 3, wherein said diode comprises an electron-type Baritt diode device.

7. A microwave movement detector as claimed in claim 1, wherein the microwave generating and receiving module comprises a thin disc.

8. A microwave movement detector as claimed in claim 7, wherein the disc has a thickness of 0.5 cm and a diameter of 3 cm.

9. A microwave movement detector as claimed in claim 1, further comprising signal processing means connected to the microwave generating and receiving module and responsive to the relationship between transmitted and reflected signals for processing said reflected microwave signal to detect movement of a target.

10. A microwave movement detector as claimed in claim 9, wherein the signal processing means produces an output when movement of said target is detected.

11. A microwave movement detector as claimed in claim 9, wherein the signal processing means comprises a signal processing module physically separated from the microwave generating and receiving module but connected thereto by a signal bus.

12. A microwave movement detector as claimed in claim 11, wherein the signal bus comprises a coaxial cable.

13. A microwave movement detector as claimed in claim 9, wherein said signal processing means provides an output, said detector further comprising an alarm connected to the output of the signal processing means.

14. A microwave movement detector as claimed in claim 13, wherein the alarm comprises a module connected to the signal processing means for producing a modulated warning tone when actuated by the output of the signal processing means.

15. A microwave movement detector as claimed in claim 13, further comprising a standby rechargeable battery for actuating said alarm.

16. A microwave movement detector as claimed in claim 9, wherein the signal processing means produces an output when at least one parameter of such movement takes on a predetermined characteristic.

17. A microwave movement detector as claimed in claim 11, wherein said signal processing means comprises:
a source for producing a pulsed current high-voltage output, said source being connected to said diode for providing said pulsed current high-voltage output thereto, said diode producing a diode output;
at least one amplifier for amplifying said diode output to provide an amplified output;
a comparator for comparing said amplified output with a reference voltage to provide a comparator output; and
a detector responsive to said comparator output for detecting movement of said target.

18. A microwave movement detector as claimed in claim 17, wherein said at least one amplifier comprises two amplifiers and filter circuits.

19. A microwave movement detector as claimed in claim 17, further comprising filter circuitry connected between said at least one amplifier and said comparator for filtering said amplified diode output prior to provision to said comparator.

20. A microwave movement detector as claimed in claim 17, wherein said diode output comprises a steady DC bias output with small Doppler signal voltage superimposed thereon, said Doppler signal voltage having a frequency and amplitude proportional to the speed and apparent size, respectively, of said moving target.

21. A microwave movement detector as claimed in claim 20, wherein said detector comprises a transistor circuit for detecting when said Doppler signal voltage is of sufficient amplitude and frequency to indicate movement of said target, and issuing a corresponding detection output, said signal processing means further comprising a relay responsive to said detection output for actuating an alarm.

22. A microwave movement detector as claimed in claim 1, wherein the microstrip circuitry comprises shaped strip conductors and a conductive ground plane separated by a dielectric medium of glass fibre polytetrafluoroethylene.

23. A microwave movement detector as claimed in claim 1, wherein said diode comprises a Baritt diode.

24. A microwave movement detector as claimed in claim 1, wherein said diode comprises a Gunn diode.

* * * * *